US008466908B2

(12) United States Patent
Yen

(10) Patent No.: US 8,466,908 B2
(45) Date of Patent: Jun. 18, 2013

(54) DISPLAY DEVICE HAVING A BIAS CONTROL UNIT FOR DYNAMICALLY BIASING A BUFFER AND METHOD THEREOF

(75) Inventor: Yu-Jen Yen, Tainan County (TW)

(73) Assignee: Himax Technologies Limited, Tainan (TW)

( * ) Notice: Subject to any disclaimer, the term of this patent is extended or adjusted under 35 U.S.C. 154(b) by 440 days.

(21) Appl. No.: 12/835,091

(22) Filed: Jul. 13, 2010

(65) Prior Publication Data

US 2012/0013587 A1 Jan. 19, 2012

(51) Int. Cl.
*G06F 3/038* (2006.01)
*G09G 5/00* (2006.01)

(52) U.S. Cl.
USPC .............................................. 345/211; 345/87

(58) Field of Classification Search
USPC ...................................... 345/87, 95, 211–212
See application file for complete search history.

(56) References Cited

U.S. PATENT DOCUMENTS

2003/0043129 A1* 3/2003 Tazuke .......................... 345/204
2007/0126722 A1* 6/2007 Hashimoto .................. 345/204
2008/0278473 A1* 11/2008 An ................................ 345/214
2009/0167747 A1* 7/2009 Gong et al. .................. 345/212

* cited by examiner

*Primary Examiner* — Chanh Nguyen
*Assistant Examiner* — Long D Pham
(74) *Attorney, Agent, or Firm* — J.C. Patents

(57) ABSTRACT

A driving device and a driving method for dynamic bias are provided. The driving device includes a buffer and a bias control unit. An input terminal of the buffer receives a data voltage, and an output terminal of the buffer is connected to a load through a switch. The bias control unit connected to the buffer controls a bias of the buffer dynamically. During a transition period of the data voltage, the bias control unit controls the buffer in a normal bias state. During a power-saving period, the bias control unit controls the buffer in a low bias state, and controls the buffer in the normal bias state during a turning-off period of the switch. The driving device controls the buffer to sustain data voltage quickly during the turning-off period of the switch, so as to avoid the data voltage received by the load having errors and reduce power consumption.

7 Claims, 9 Drawing Sheets

DISPLAY DEVICE HAVING A BIAS CONTROL UNIT FOR DYNAMICALLY BIASING A BUFFER AND METHOD THEREOF

BACKGROUND

1. Field of the Invention

The invention relates to a bias driving technique for a flat panel display. More particularly, the invention relates to a driving technique for dynamic bias for controlling a buffer to operate in a low bias state during a power-saving period, so as to maintain a display quality and reduce power consumption.

2. Description of Related Art

Buffers are widely applied in various electronic devices, and especially in a flat panel display (for example, a liquid crystal display (LCD)), a large amount of the buffers has to be used for driving pixel loads (taking the LCD as an example, the pixel load refers to a pixel capacitor). In detail, a source driver of the flat panel display requires a large amount of the buffers, which can transmit data voltage of each pixel to the corresponding pixel load, so as to update each pixel data of a frame.

In a conventional bias control technique of the buffer, the flat panel display provides adequate bias to each buffer, so that each buffer has adequate driving capability to quickly update the data voltage of the pixel load, as that shown in FIG. 1 and FIG. 2. FIG. 1 is a block diagram illustrating a conventional flat panel display 10, and FIG. 2 is a bias waveform diagram of a buffer 140 used for driving a pixel load 180. Referring to FIG. 1, the flat panel display 10 mainly includes a timing controller 110, a source driver 120, a gate driver 150 and a display panel 160. The source driver 120 includes a driving circuit 130 and a plurality of buffers 140, wherein a number of the buffers 140 is determined according to a number of pixels on each scan line in the display panel 160. A pixel circuit 165 in the display panel 160 is taken as an example, and the pixel circuit 165 includes a switch 170 and a pixel load 180.

In the present embodiment, the timing controller 110 receives a data signal D to be displayed on the display panel 160 and a data enable signal DE, and converts the received signals into a line latch signal TP, and an output enable signal OE, etc., and respectively provides the converted signals to the source driver 120 and the gate driver 150 for utilization. In the present embodiment, the data signal D includes a plurality of data voltages DV corresponding to each of the pixels. The gate driver 150 receives the output enable signal OE, and generates a switch control signal GL according to the output enable signal OE, so that the data voltage DV can be transmitted to the pixel load 180 through the switch 170. The driving circuit 130 receives the data signal D, and transmits the data voltage DV corresponding to the pixel circuit 165 to the buffer 140 according to the line latch signal TP. In this way, the buffer 140 receives adequate bias all the time, and transmits the data voltage DV to one end of the switch 170 of the pixel circuit 165, and further transmits the data voltage DV to the pixel load 180 according to the switch control signal GL received by a control end of the switch 170, and a detailed waveform diagram thereof is as that shown in FIG. 2.

Referring to FIG. 2, the line latch signal TP triggers the driving circuit 130 to update the data voltage DV. After the line latch signal TP generates a pulse, the buffer 140 adjusts a data voltage OPD at an output terminal of the buffer 140 according to the received data voltage DV during a transition period T1, so as to provide the data voltage DV to one end of the switch 170. Then, during a conduction period (i.e. a period that the switch control signal GL is in a high level) of the switch 170, the data voltage OPD is supplied to the pixel load 180 through the switch 170, so that the display panel 160 can display an image provided by the data signal D.

Since the conventional flat panel display 10 provides the same and adequate bias to each of the buffers 140, though the buffer 140 does not require such powerful driving capability for the data voltage OPD during a period other than an output transition period (for example, the transition period T1 shown in FIG. 2), so that extra power is wasted in the buffer 140, which causes a waste of energy. However, if the bias of the buffer 140 is reduced, the driving capability for the data voltage DV is inadequate, so that the data voltage DV cannot be transmitted to the pixel load 180 in time, which may cause a partial white phenomenon and a discontinuous phenomenon of the image displayed on the display panel 160.

SUMMARY

The invention is directed to a driving device for dynamic bias, which controls a buffer to operate in a low bias state during a power-saving period, and controls the buffer to operate in a normal bias state during a transition period of switching a switch from a turned-on state to a turned-off state and a transition period of a data voltage, so as to maintain a display quality of a flat panel display and reduce power consumption.

The invention is directed to a driving method for dynamic bias, by which a buffer is controlled to operate in a low bias state during a power-saving period, and is controlled to operate in a normal bias state during a transition period of switching a switch from a turned-on state to a turned-off state and a transition period of a data voltage, so as to maintain a display quality of a flat panel display and reduce power consumption.

The invention provides a driving device for dynamic bias. The driving device for dynamic bias includes a buffer and a bias control unit. An input terminal of the buffer receives a data voltage, and an output terminal of the buffer is coupled to a load through a switch. The bias control unit connected to the buffer dynamically controls a bias of the buffer. During a transition period of the data voltage, the bias control unit controls the buffer to operate in a normal bias state. During a power-saving period, the bias control unit controls the buffer to operate in a low bias state, and controls the buffer to operate in the normal bias state during a transition period of switching the switch from a turned-on state to a turned-off state.

In an embodiment of the invention, the power-saving period is a stable-state period of the data voltage, and the power-saving period is not overlapped to the transition period of switching the switch from the turned-on state to the turned-off state.

In an embodiment of the invention, the bias control unit includes a bias signal generating unit and a first bias generating unit. The bias signal generating unit is used for generating a bias control signal, wherein during the transition period of the data voltage, the bias signal generating unit sets the bias control signal to a first potential. During the power-saving period, the bias signal generating unit sets the bias control signal to a second potential. Moreover, during the transition period of switching the switch from the turned-on state to the turned-off state, the bias signal generating unit sets the bias control signal to the first potential. The first bias generating unit is connected to the bias signal generating unit, and the first bias generating unit generates a first bias to the buffer according to the bias control signal, so as to control the buffer to operate in the normal bias state or the low bias state.

In an embodiment of the invention, the first bias generating unit includes a first transistor, a second transistor, a first current source, a first switch and a second switch. A first end of the first transistor is coupled to a system voltage, and a control end of the first transistor is coupled to the buffer for generating the first bias. A first end of the second transistor is coupled to the system voltage. A supply end of the first current source is coupled to a second end of the first transistor and a second end of the second transistor. A control end of the first switch receives the bias control signal, a first end of the first switch is coupled to the system voltage, and a second end of the first switch is coupled to a control end of the second transistor. A control end of the second switch receives the bias control signal, a first end of the second switch is coupled to the supply end of the first current source, and a second end of the second switch is coupled to the control end of the second transistor. When the bias control signal has the first potential, the first switch is turned on and the second switch is turned off, so as to set the first bias to a first normal bias value. When the bias control signal has the second potential, the first switch is turned off and the second switch is turned on, so as to set the first bias to a first low bias value.

In an embodiment of the invention, the buffer includes an operational amplifier and a first buffer current source. A non-inverting terminal of the operational amplifier serves as an input terminal of the buffer, and an inverting terminal of the operational amplifier is coupled to an output terminal of the operational amplifier, and serves as an output terminal of the buffer. A control end of the first buffer current source receives the first bias, a first end of the first buffer current source receives the system voltage, and a second end of the first buffer current source is coupled to a first power terminal of the operational amplifier, and the first buffer current source determines an operating state of the operational amplifier according to the first bias.

In an embodiment of the invention, the bias control unit further includes a second bias generating unit coupled to the bias signal generating unit. The second bias generating unit generates a second bias to the buffer according to the bias control signal, so as to control the buffer to operate in the normal bias state or the low bias state.

In an embodiment of the invention, the second bias generating unit includes a third transistor, a fourth transistor, a second current source, a third switch and a fourth switch. A first end of the third transistor is coupled to a ground voltage, and a control terminal thereof is coupled to the buffer, and generates the second bias. A first end of the fourth transistor is coupled to the ground voltage. A supply end of the second current source is coupled to a second end of the third transistor and a second end of the fourth transistor. A control end of the third switch receives the bias control signal, a first end of the third switch is coupled to the ground voltage, and a second end of the third switch is coupled to a control end of the fourth transistor. A control end of the fourth switch receives the bias control signal, a first end of the fourth switch is coupled to the supply end of the second current source, and a second end of the fourth switch is coupled to the control end of the fourth transistor. When the bias control signal has the first potential, the third switch is turned on and the fourth switch is turned off, so as to set the second bias to a second normal bias value. When the bias control signal has the second potential, the third switch is turned off and the fourth switch is turned on, so as to set the second bias to a second low bias value.

In an embodiment of the invention, the buffer further includes a second buffer current source. A control end of the second buffer current source receives the second bias, and a first end of the second buffer current source receives the ground voltage. A second end of the second buffer current source is coupled to a second power terminal of the operational amplifier. Moreover, the first buffer current source and the second buffer current source determine an operating state of the operational amplifier according to the first bias and the second bias.

According to another aspect, the invention provides a driving method for dynamic bias, and the driving method for dynamic bias is adapted to a buffer, wherein an input terminal of the buffer receives a data voltage, and an output terminal of the buffer is coupled to a load through a switch. The driving method for dynamic bias can be described as follows. During a transition period of the data voltage, the buffer is controlled to operate in a normal bias state. During a power-saving period, the buffer is controlled to operate in a low bias state. During a transition period of switching the switch from a turned-on state to a turned-off state, the buffer is controlled to operate in the normal bias state.

In an embodiment of the invention, the power-saving period is a stable-state period of the data voltage, and the power-saving period is not overlapped to the transition period of switching the switch from the turned-on state to the turned-off state.

According to the above descriptions, during the transition period of the data voltage, the bias control unit controls the buffer to operate in the normal bias state, and controls the buffer to operate in the low bias state during the power-saving period. Then, during the transition period of switching the switch from the turned-on state to the turned-off state, the bias control unit controls the buffer to again operate in the normal bias state, so that the buffer can quickly adjust a data signal variation caused by parasitic capacitance while the switch is switched from the turned-on state to the turned-off state (which is also referred to as a transition period of the switch), so as to avoid an error between the signal received by the pixel load and the original data signal, and accordingly maintain a display quality of the flat panel display and reduce the power consumption.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
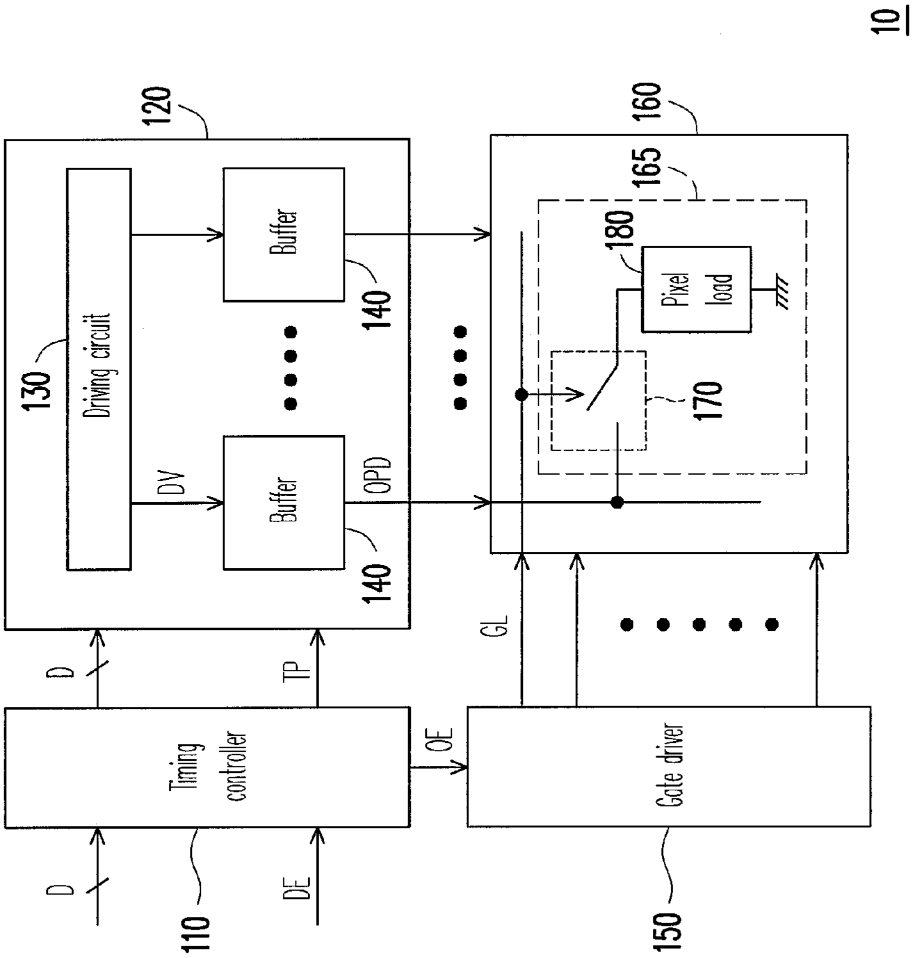
FIG. 1 (RELATED ART)
FIG. 1 is a block diagram illustrating a conventional flat panel display.
Figure 2:
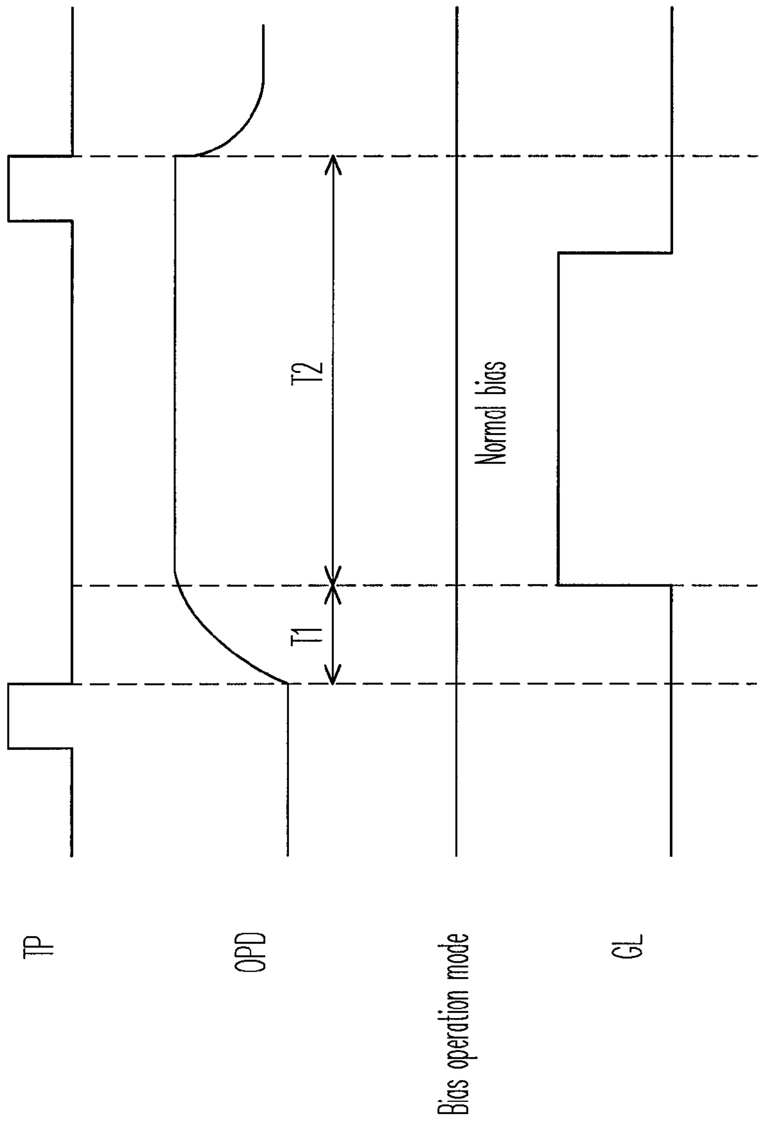
FIG. 2 (RELATED ART)
FIG. 2 is a bias waveform diagram of a buffer used for driving a pixel load.

Reference will now be made in detail to the present preferred embodiments of the invention, examples of which are illustrated in the accompanying drawings. Wherever possible, the same reference numbers are used in the drawings and the description to refer to the same or like parts.

Figure 3:
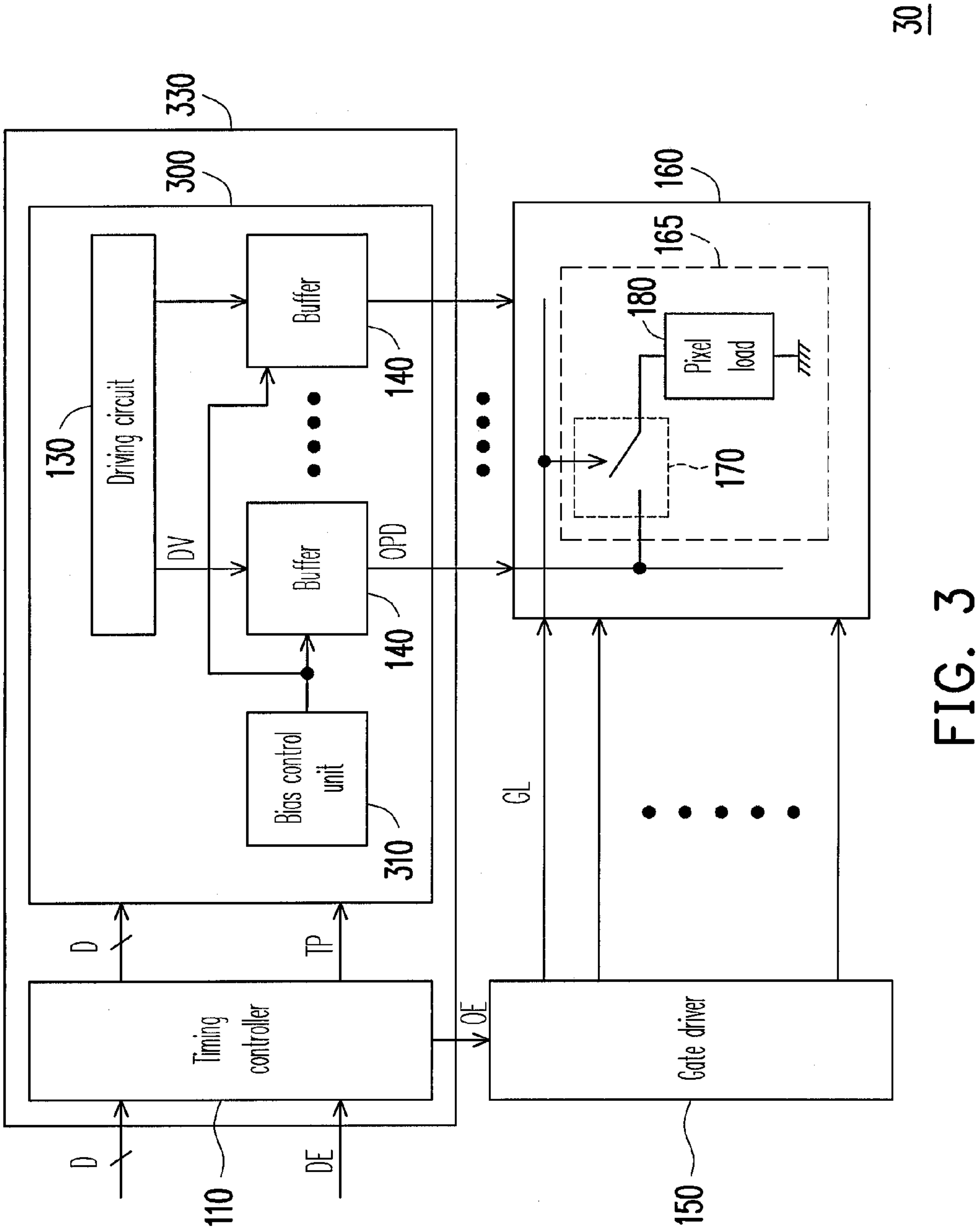
FIG. 3 is a block diagram illustrating a driving device for dynamic control.

An embodiment of the invention is described with reference of FIG. 3, and FIG. 3 is a block diagram illustrating a driving device 300 (e.g. source driver or data driver) for dynamic control. It should be noticed that in the present embodiment, although a flat panel display 30 is taken as an example for description, the embodiments of the invention are also suitable for other electronic devices having the buffers, so that the invention is not limited to the provided flat panel display 30. Referring to FIG. 3, implementation of the flat panel display 30 is the same to that in the embodiment of FIG. 1, and therefore detailed description thereof is not repeated. A difference between the present embodiment and the embodiment of FIG. 1 is that the driving device 300 for dynamic control of FIG. 3 is used to replace the source driver 120 of the flat panel display 10 of FIG. 1, and a function of a driving circuit 130 of FIG. 3 is the same as that described in the embodiment of FIG. 1. In the present embodiment, the driving device 300 for dynamic control includes a buffer 140 and a bias control unit 310. An input terminal of the buffer 140 receives a data voltage DV, and a data voltage OPD at an output terminal of the buffer 140 is adjusted according to the data voltage DV, and the output terminal of the buffer 140 is coupled to a pixel load 180 through a switch 170 of a pixel circuit 165.

In the present embodiment, a timing controller 110 and the driving device 300 for dynamic control are integrated to form a data control unit 330. The bias control unit 310 can dynamically control a bias of the buffer 140 according to a plurality of signals generated by the timing controller 110, though the invention is not limited thereto, and in other embodiments, the driving device 300 for dynamic control is not integrated with the timing controller 110 in a same chip, but is electrically coupled to the timing controller 110 and the gate driver 150, so as to obtain the required signals to dynamically control the bias of the buffer 140, and detailed description thereof is not repeated.

Figure 4:
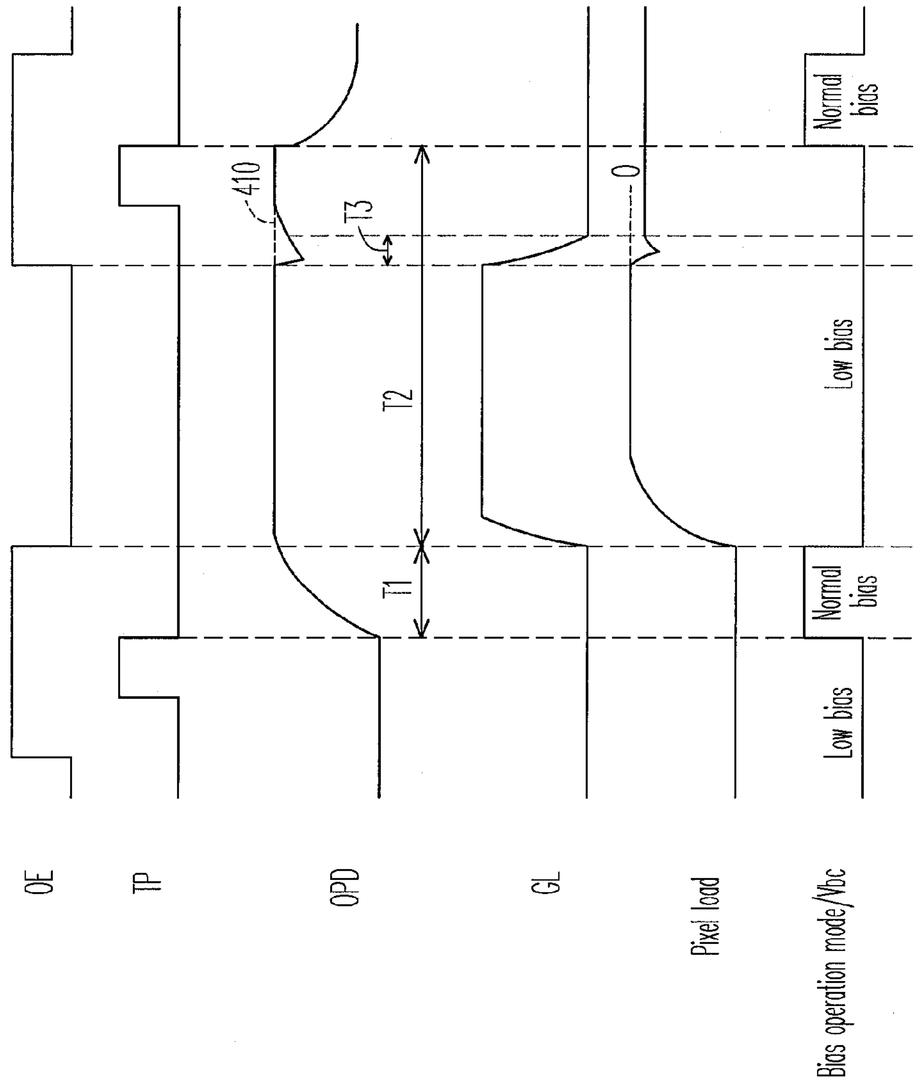
FIG. 4 is a waveform diagram of a driving device for dynamic control.

The bias control unit 310 of the present embodiment controls the buffer 140 to operate in a low bias state during a non-transition period T2, so as to reduce the power consumption. Referring to FIG. 4, FIG. 4 is a waveform diagram of the driving device 300 for dynamic control. A time interval between two pulses of a line latch signal TP is a time required for updating the data voltage DV of the pixel load 180. The gate driver 150 receives an output enable signal OE, and controls the switch 170 to be in a turned-on state (i.e. a switch control signal GL has a high level) or a turned-off state (i.e. the switch control signal GL has a low level) according to the output enable signal OE. The buffer 140 adjusts the data voltage OPD according to the data voltage DV and its bias state.

Referring to FIG. 4 again, a transition period T1 of the buffer 140 is a period that the buffer 140 adjusts the data voltage OPD according to the data voltage DV, and a time period T2 is a stable-state period of the buffer 140. Theoretically, during the transition period T1, the bias control unit 310 controls the buffer 140 to operate in a normal bias mode, and during the stable-state period T2, the bias control unit 310 controls the buffer 140 to operate in a low bias mode, so as to reduce the power consumption of the buffer 140, and a theoretical data voltage OPD is shown by a dotted line 410 of FIG. 4, which is not pulled low.

Though in an actual operation of the flat panel display 30, during a transition period of switching the switch 170 from the turned-on state to the turned-off state (a transition period T3 shown in FIG. 4), due to a parasitic capacitance coupling effect among the switch 170, the buffer 140 and the pixel load 180, the data voltage OPD is pulled low as the switch control signal GL is varied, and meanwhile the switch 170 is not totally turned off, so that a data voltage stored by the pixel load 180 is synchronously decreased. Moreover, since the buffer 140 is in the low bias state, a driving capability thereof is relatively weak, so that a relatively long time is required for the buffer 140 restoring the pulled-low data voltage OPD to an original value O. If the buffer 140 cannot opportunely pull high the data voltage OPD to the original value O before the switch 170 is totally turned off (i.e. before the transition period T3 of the switch 170 is ended), a data voltage (i.e. the original value O) desired to be displayed and the actual data voltage of the pixel load 180 may have an error, which may cause a partial white phenomenon and a discontinuous phenomenon of a displayed image, so that a quality of the displayed image is decreased.

Therefore, the bias control unit 310 of the present embodiment controls the buffer 140 to operate in the normal bias state during the transition period T3, so that the buffer 140 may have adequate driving capability during the transition period T3 of the switch 170, and therefore the data voltage can be quickly sustained to the data voltage OPD during the transition period T3. In this way, the display quality of the display panel 160 is maintained, and the power consumption is reduced.

Figure 5:
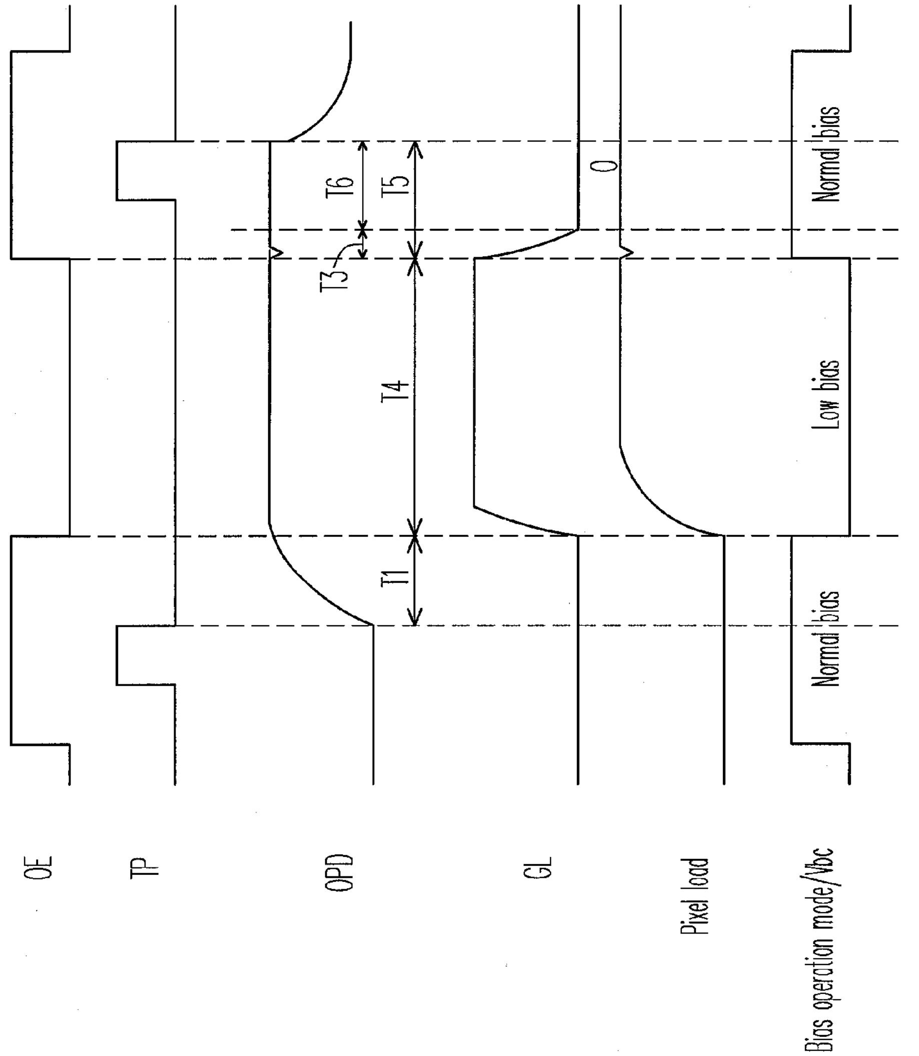
FIG. 5 is a waveform diagram of a driving device for dynamic control according to a first embodiment of the invention.

As shown in FIG. 5, FIG. 5 is a waveform diagram of a driving device 300 for dynamic control according to a first embodiment of the invention. The so-called "dynamic control" refers to that the driving device 300 for dynamic control can quickly control and change the bias of the buffer in real-time according to a state of the data signal, so as to maintain an output quality of the data voltage and achieve a power-saving effect. Referring to FIG. 3 and FIG. 5, in the first embodiment of the invention, the structure of the flat panel display 30 of FIG. 3 is used to implement the technical effects of FIG. 5, though the present embodiment can also be applied in other electronic devices having the buffers, so that the invention is not limited to the provided flat panel display 30. In the present embodiment, to simplify the descriptions to fully convey the technical futures of the present embodiment to those skilled in the art, assuming switching of a bias mode of the buffer 140 does not require time, i.e. the buffer 140 of FIG. 5 can instantly switch its bias mode.

A difference between the present embodiment and the aforementioned embodiment is that during the transition period of switching the switch 170 from the turned-on state to the turned-off state, the bias control unit 310 controls the buffer 140 to operate in the normal bias mode. In the present embodiment, the bias control unit 310 can switch the bias mode of the buffer 140 according to the output enable signal OE. In detail, in the present embodiment, during the transition period T1, the bias control unit 310 controls the buffer 140 to operate in the normal bias mode. Then, during the power-saving period T4, the data voltage OPD is now in a stable state, and the switch 170 is in the turned-on state according to the output enable signal OE, and now the buffer 140 is only required to maintain the data voltage OPD, so that the bias control unit 310 controls the buffer 140 to operate in the low bias mode, so as to reduce the power consumption. Then, during a time period T5, in the present embodiment, the time period T5 includes the transition period T3 of switching the switch 170 from the turned-on state to the turned-off state, and the power-saving period T4 is not overlapped to the transition period T3. Now, since the data voltage OPD is decreased due to a transition of the switch control signal GL, the bias control unit 310 controls the buffer 140 to operate in the normal bias mode, so that the buffer 140 can quickly pull high the data voltage OPD to the original value O before the switch 170 is totally turned off. In this way, the display quality is maintained, and meanwhile the power consumption is reduced. Moreover, in other embodiments, besides a time interval shown in FIG. 5, the power-saving period T4 may also include a time period T6 (the time period T5 minus the transition period T3 of the switch 170), so as to further reduce the power consumption of the buffer 140, though a detailed description thereof is not repeated.

Figure 6:
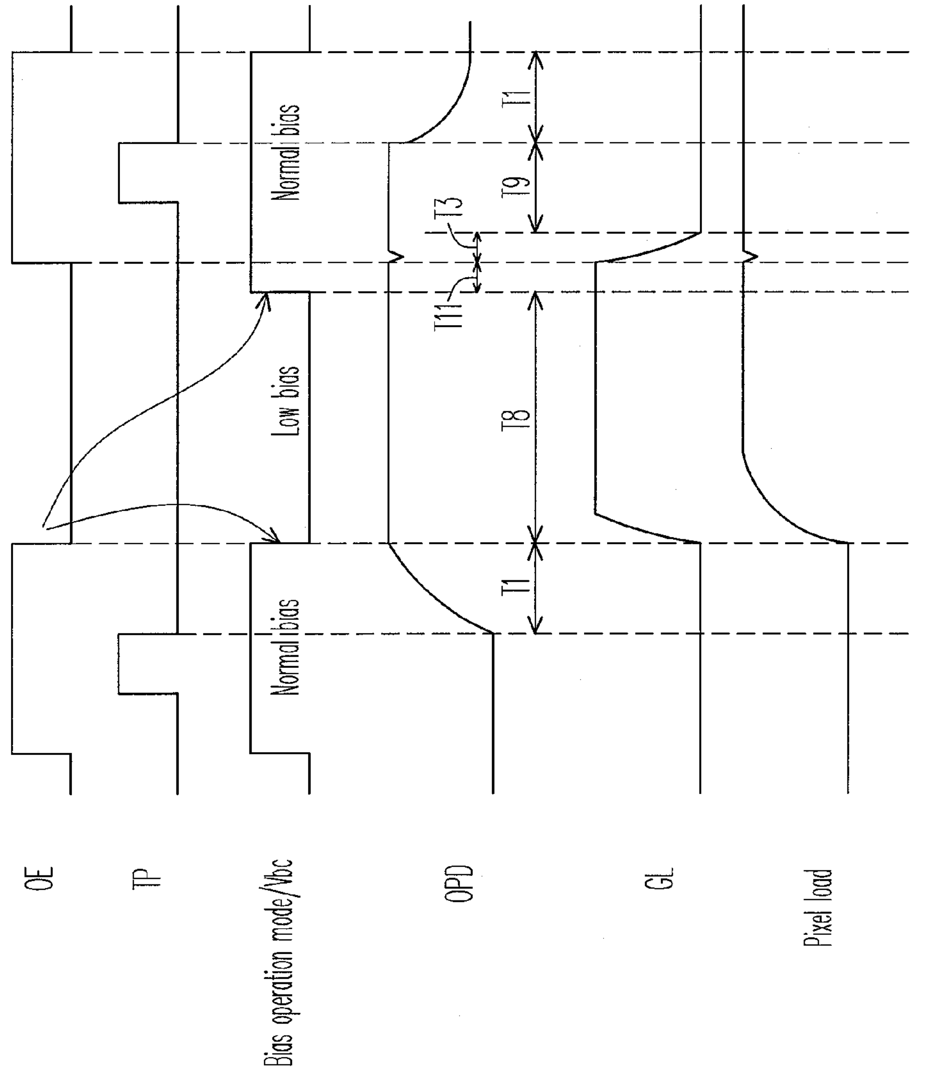
FIG. 6 is a waveform diagram of a driving device for dynamic control according to a second embodiment of the invention.

In the above embodiment it is assumed that the buffer 140 can instantly switch its bias mode, though actually a period of time is required for switching the bias mode of the buffer 140, a second embodiment of the invention is provided to cope with the above implementation. As shown in FIG. 6, FIG. 6 is a waveform diagram of a driving device 300 for dynamic control according to a second embodiment of the invention. A difference between the present embodiment and the first embodiment is that since a period of time is required for switching the bias mode of the buffer 140, the bias control unit 310 calculates the transition period T1 of the data voltage OPD (or the transition period of the data voltage DV), the power-saving period T8 and the transition period T3 by using the output enable signal OE and a counter or a timer (not shown) in internal of the bias control unit 310. The bias control unit 310 controls the buffer 140 to switch to the low bias mode when the output enable signal OE is falling to low. In the present embodiment, the bias control unit 310 also calculates and reserves a time period T11 after the power-saving period T8 and before the transition period T3 according to the output enable signal OE. The bias control unit 310 controls the buffer 140 to switch to the normal bias mode during the time period T11 and the transition period T3, so as to quickly pull high and maintain the data voltage OPD to achieve a spirit and a purpose of the invention. The bias control unit 310 controls the buffer 140 to maintain the normal bias mode during a time period T9 and the transition period T1 after the transition period T3. The other detailed operations of the present embodiment are as that described in the aforementioned embodiment, and thereof detailed descriptions thereof are not repeated.

Moreover, in other embodiments, besides a time interval shown in FIG. 6, the time period T9 and the time period T11 can be operated in the low bias mode as the power-saving period T8, i.e. the bias control unit 310 controls the buffer 140 to switch to the low bias mode during the power-saving period T8, the time period T11 and the time period T9, so as to further reduce the power consumption of the buffer 140, though a detailed description thereof is not repeated.

Figure 7:
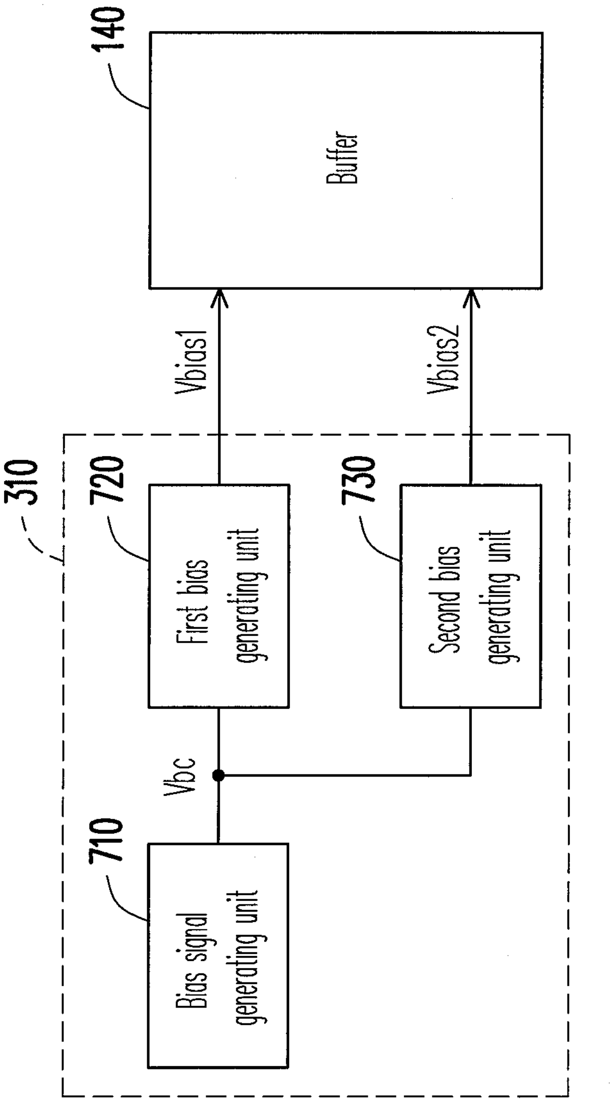
FIG. 7 is a block diagram illustrating a driving device for dynamic control according to a first embodiment of the invention.

Detailed operation principle of the bias control unit 310 is introduced below. Referring to FIG. 7, FIG. 7 is a block diagram illustrating a driving device for dynamic control according to a first embodiment of the invention. In the present embodiment, the bias control unit 310 includes a bias signal generating unit 710 and a first bias generating unit 720. Referring to FIG. 5 and FIG. 7, during the transition period T1 of the data voltage, the bias signal generating unit 710 sets a bias control signal Vbc to a first potential (for example, a high potential illustrated in FIG. 5). During the power-saving period T4, the bias signal generating unit 710 sets the bias control signal Vbc to a second potential (for example, a low potential illustrated in FIG. 5). Moreover, during the time period T5 (the time period T5 includes the transition period T3 of the switch 170), the bias signal generating unit 710 sets the bias control signal Vbc to the first potential.

Referring to FIG. 7 again, the first bias generating unit 720 is coupled to the bias signal generating unit 710, and generates a first bias Vbias1 to the buffer 140 according to the bias control signal Vbc, so as to control the buffer 140 to operate in the normal bias state or the low bias state. In detail, when the bias control signal Vbc has the first potential, the first bias generating unit 720 sets the buffer 140 to operate in the normal bias state. Moreover, when the bias control signal Vbc has the second potential, the first bias generating unit 720 sets the buffer 140 to operate in the low bias state. In other embodiments, the bias control unit 310 may further include a second bias generating unit 730 coupled to the bias signal generating unit 710. The second bias generating unit 730 generates a second bias Vbias2 to the buffer 140 according to the bias control signal Vbc, so as to control the buffer 140 to operate in the normal bias state or the low bias state. Moreover, those skilled in the art can easily deduce that there is a plurality of implementations (such as FPGA, CPLD, PPL, microchip and ASC, etc.) for the bias signal generating unit 710 calculating and generating the bias control signal Vbc to control the bias mode of the buffer 140 according to the signals generated by the timing controller 110 such as the output enable signal OE or the line latch signal TP, though the invention is not limited to the above implementations.

Figure 8:
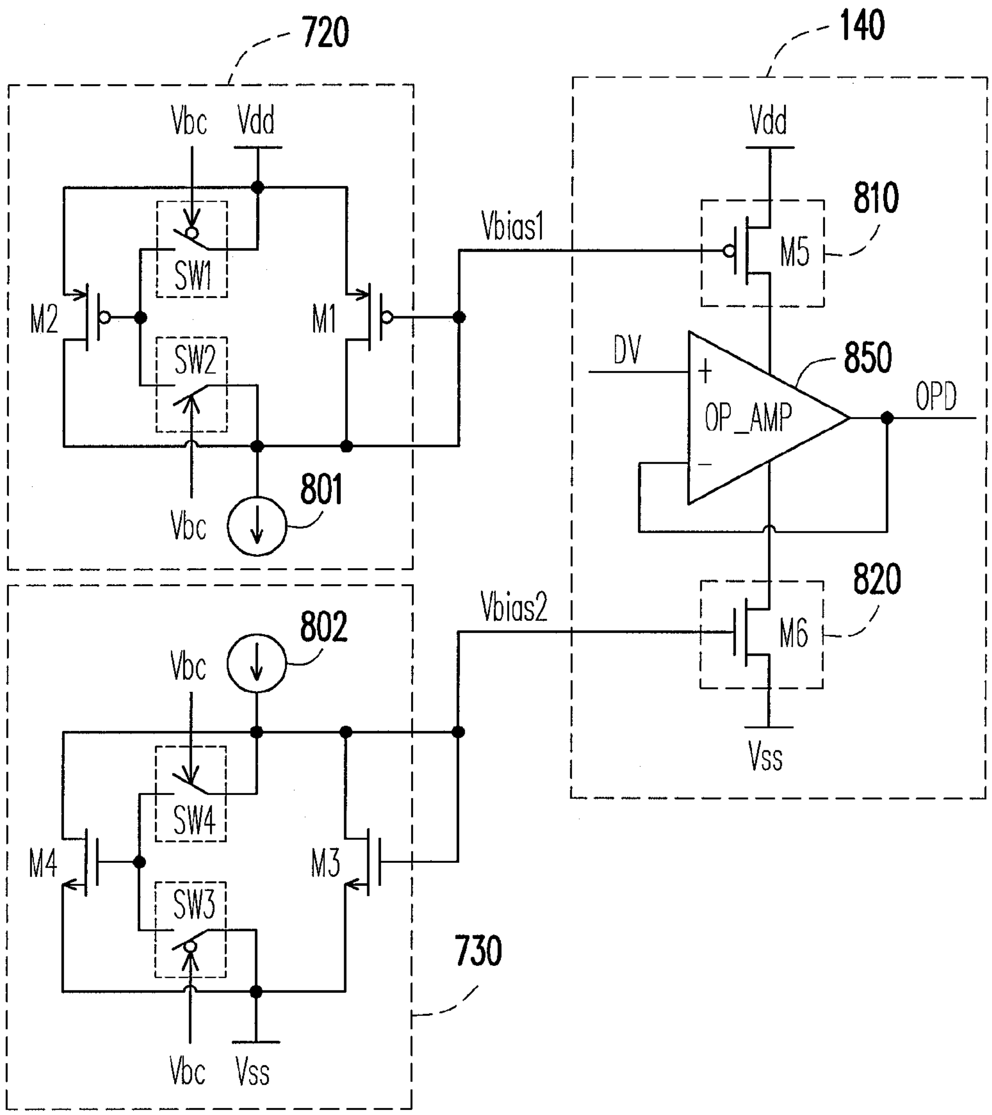
FIG. 8 is a circuit diagram illustrating a driving device for dynamic control according to a first embodiment of the invention.

The first bias generating unit 720, the second bias generating unit 730 and the buffer 140 of the present embodiment are described in detail with reference of FIG. 8. FIG. 8 is a circuit diagram illustrating a driving device 300 for dynamic control according to the first embodiment of the invention. Referring to FIG. 8, the first bias generating unit 720 includes a first transistor M1, a second transistor M2, a first current source 801, a first switch SW1 and a second switch SW2. A first end (for example, a source) of the first transistor M1 and a first end (for example, a source) of the second transistor M2 are all coupled to a system voltage Vdd, and a second end (for example, a drain) of the first transistor M1 and a second end (for example, a drain) of the second transistor M2 are all coupled to a supply end of the first current source 801, while a control end (for example, a gate) of the first transistor M1 is coupled to the buffer 140 for generating the first bias Vbias1. Control ends of the first switch SW1 and the second switch SW2 all receive the bias control signal Vbc, a first end of the first switch SW1 is coupled to the system voltage Vdd, a first end of the second switch SW2 is coupled to the supply end of the first current source 801, and second ends of the first switch SW1 and the second switch SW2 are all coupled to a control end (for example, a gate) of the second transistor M2. Moreover, in the present embodiment, the first transistor M1 and the second transistor M2 can be implemented by a P-channel metal oxide semiconductor field-effect transistor (P-MOSFET), which is also referred to as a P-channel transistor.

The second bias generating unit 730 includes a third transistor M3, a fourth transistor M4, a second current source 802, a third switch SW3 and a fourth switch SW4. A first end (for example, a source) of the third transistor M3 and a first end (for example, a source) of the fourth transistor M4 are all coupled to a ground voltage Vss, and a control end (for example, a gate) of the third transistor M3 generates the second bias Vbias2, and is coupled to the buffer 140. A supply end of the second current source 802 is coupled to a second end (for example, a drain) of the third transistor M3 and a second end (for example, a drain) of the fourth transistor M4. Control ends of the third switch SW3 and the fourth switch SW4 all receive the bias control signal Vbc, a first end of the third switch SW3 is coupled to the ground voltage Vss, a first end of the fourth switch SW4 is coupled to the supply end of the second current source 802, and second ends of the third switch SW3 and the fourth switch SW4 are all coupled to a control end (for example, a gate) of the forth transistor M4. Moreover, in the present embodiment, the third transistor M3 and the fourth transistor M4 can be implemented by an N-channel metal oxide semiconductor field-effect transistor (N-MOSFET), which is also referred to as an N-channel transistor.

The buffer 140 includes an operational amplifier 850 and a first buffer current source 810 and a second buffer current source 820. A non-inverting terminal of the operational amplifier 850 serves as an input terminal of the buffer 140, and an inverting terminal of the operational amplifier 850 is coupled to an output terminal of the operational amplifier 850, and serves as an output terminal of the buffer 140. A control end of the first buffer current source 810 receives the first bias Vbias1, a first end of the first buffer current source 810 receives the system voltage Vdd, and a second end of the first buffer current source 810 is coupled to a first power terminal of the operational amplifier 850. A control end of the second buffer current source 820 receives the second bias Vbias2, a first end of the second buffer current source 820 receives the ground voltage Vss, and a second end of the second buffer current source 820 is coupled to a second power terminal of the operational amplifier 850. In the present embodiment, the first buffer current source 810 and the second buffer current source 820 can be respectively implemented by a P-channel transistor (PMOS) M5 and an N-channel transistor (NMOS) M6. Control ends of the transistors M5 and M6 are respectively the control ends of the first buffer current source 810 and the second buffer current source 820, sources of the transistors M5 and M6 respectively receive the system voltage Vdd and the ground voltage Vss, and drains of the transistors M5 and M6 are respectively coupled to the first power terminal and the second power terminal of the operational amplifier 850.

In this way, the first buffer current source 810 and the second buffer current source 820 determine an operating state of the operational amplifier 850 according to the first bias Vbias1 and the second bias Vbias2. In detail, when the bias control signal Vbc has the first potential, the first switch SW1 and the third switch SW3 are turned on, and the second switch SW2 and the fourth switch SW4 are turned off, so that the second transistor M2 and the fourth transistor M4 are in the turned-off state, and the first transistor M1 and the third transistor M3 are maintained to the turned-on state, and the first bias generating unit 720 and the second bias generating unit 730 respectively set the first bias Vbias1 and the second bias Vbias2 to a first normal bias value and a second normal bias value. Therefore, the first buffer current source 810 and the second buffer current source 820 in the buffer 140 may generate adequate current to drive the operational amplifier 850 to operate in the normal bias state, and the operational amplifier 850 may adjust the data voltage OPD according to the data voltage DV.

Comparatively, when the bias control signal Vbc has the second potential, the first switch SW1 and the third switch SW3 are turned off, and the second switch SW2 and the fourth switch SW4 are turned on, so that the transistors M1-M4 are all turned on. In this way, the first bias generating unit 720 and the second bias generating unit 730 respectively set the first bias Vbias1 and the second bias Vbias2 to a first low bias value and a second low bias value. Therefore, the first buffer current source 810 and the second buffer current source 820 in the buffer 140 may respectively generate a lower current to drive the operational amplifier 850 to operate in the low bias state, so that the operational amplifier 850 maintains the data voltage OPD, so as to reduce the power consumption.

Figure 9:
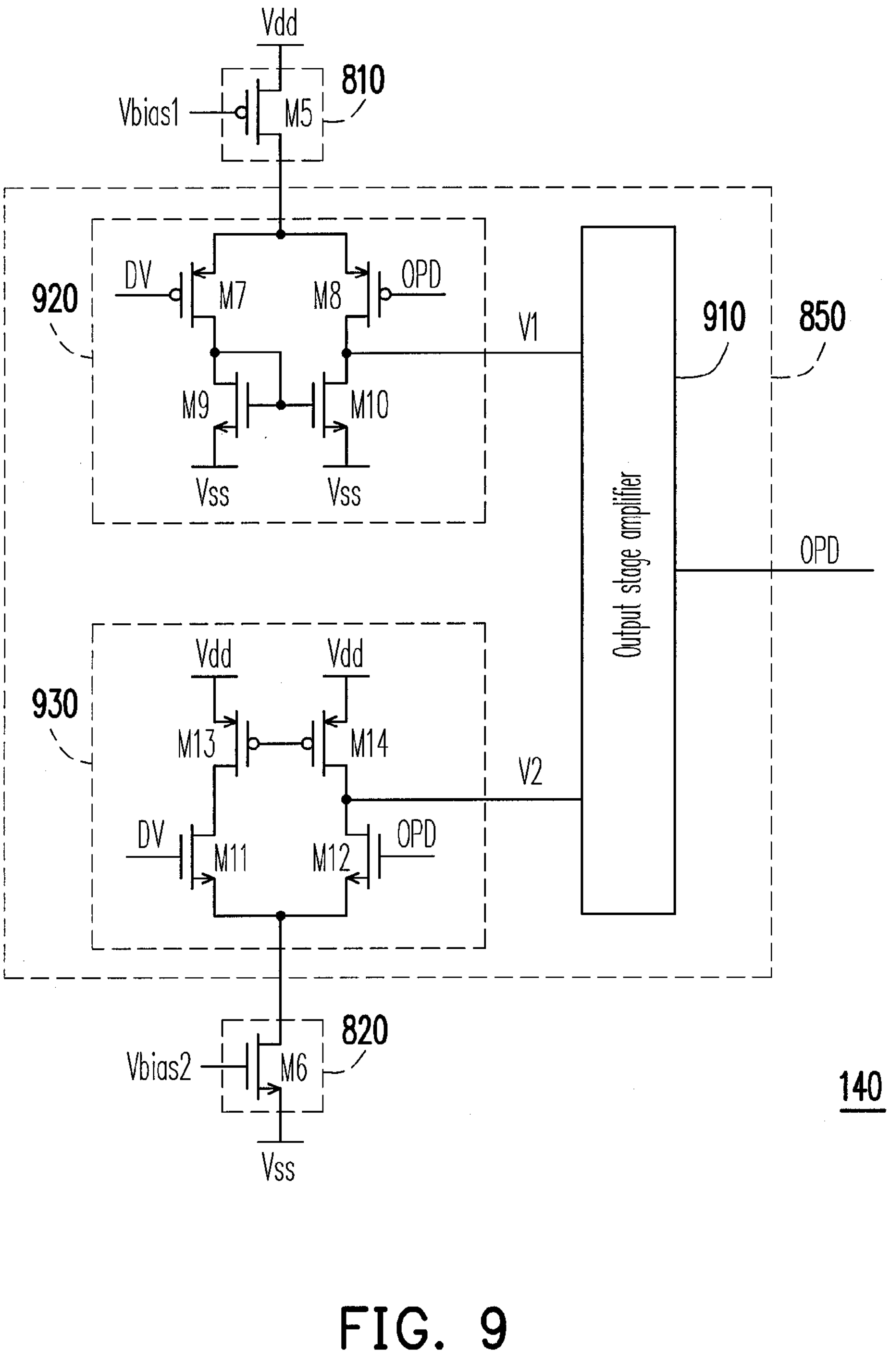
FIG. 9 is a circuit diagram illustrating a buffer according to a first embodiment of the invention.

A circuit structure of the buffer 140 of the present embodiment is described in detail below with reference of FIG. 9, and FIG. 9 is a circuit diagram illustrating a buffer 140 according to the first embodiment of the invention. In the present embodiment, the operational amplifier 850 in the buffer 140 is, for example, a rail-to-rail amplifier, though the other types of amplifier can also be used, which is not limited by the invention. As shown in FIG. 9, the buffer 140 includes the first buffer current source 810, the second buffer current source 820, an output stage amplifier 910, a first input stage amplifier 920 and a second input stage amplifier 930. In the present embodiment, the first input stage amplifier 920 and the second input stage amplifier 930 are, for example, differential amplifiers, though other types of input stage amplifiers can also be used, which is not limited by the invention. Moreover, the first buffer current source 810 and the second buffer current source 820 are as that described in the aforementioned embodiment, and thereof detailed descriptions thereof are not repeated.

The first input stage amplifier 920 includes transistors M7-M10. Sources of the transistors M7 and M8 serve as the first power terminal of the operational amplifier 850, and the transistors M7-M10 form a differential amplifier. Control ends of the transistors M7 and M8 serve as input terminals of the differential amplifier, and respectively receive the data voltages DV and OPD on the non-inverting terminal and the inverting terminal of the operational amplifier 850, so as to generate a voltage V1 at a drain of the transistor M8. The second input stage amplifier 930 includes transistors M11-M14. Sources of the transistors M11 and M12 serve as the second power terminal of the operational amplifier 850, and the transistors M11-M14 form a differential amplifier. Control ends of the transistors M11 and M12 serve as input terminals of the differential amplifier, and respectively receive the data voltages DV and OPD on the non-inverting terminal and the inverting terminal of the operational amplifier 850, so as to generate a voltage V2 at a drain of the transistor M14. Moreover, the output stage amplifier 910 receives the voltages V1 and V2, and accordingly generates the data voltage OPD of the buffer 140. Those skilled in the art may know an actuation method of the operation amplifier 850 according to its circuit coupling state, so that the buffer 140 can determine the driving capability of the operational amplifier 850 according to the first bias Vbias1 and the second bias Vbias2.

Moreover, in other embodiments, the bias control unit 310 can also use the bias signal generating unit 710 and the first bias generating unit 720 to control the bias operating state of the buffer 140 without using the second bias generating unit 730 and the second buffer current source 820, though the invention is not limited thereto.

In summary, during the transition period of the data voltage, the bias control unit controls the buffer to operate in the normal bias state, and controls the buffer to operate in the low bias state during the power-saving period. Then, during the transition period of switching the switch from the turned-on state to the turned-off state, the bias control unit controls the buffer to again operate in the normal bias state, so that the buffer can quickly adjust a data signal variation caused by parasitic capacitance while the switch is switched from the turned-on state to the turned-off state, so as to avoid an error between the signal received by the pixel load and the original data signal, and accordingly maintain a display quality of the flat panel display and reduce the power consumption.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A driving device for dynamic bias, comprising:

a buffer, having an input terminal receiving a data voltage, and an output terminal coupled to a load through a switch; and a bias control unit, connected to the buffer, for dynamically controlling a bias of the buffer, wherein the bias control unit controls the buffer to operate in a normal bias state during a transition period of the data voltage, the bias control unit controls the buffer to operate in a low bias state during a power-saving period, and controls the buffer to operate in the normal bias state during a transition period of switching the switch from a turned-on state to a turned-off state, wherein the bias control unit comprises:

a bias signal generating unit, for generating a bias control signal, wherein the bias signal generating unit sets the bias control signal to a first potential during the transition period of the data voltage, the bias signal generating unit sets the bias control signal to a second potential during the power-saving period, and the bias signal generating unit sets the bias control signal to the first potential during the transition period of switching the switch from the turned-on state to the turned-off state; and a first bias generating unit, connected to the bias signal generating unit, and generating a first bias to the buffer according to the bias control signal, so as to control the buffer to operate in the normal bias state or the low bias state, wherein the first bias generating unit comprises:

a first transistor, having a first end coupled to a system voltage, and a control end coupled to the buffer and a second end of the first transistor for generating the first bias;

a second transistor, having a first end coupled to the system voltage;

a first current source, having a supply end coupled to the second end of the first transistor and a second end of the second transistor;

a first switch, having a control end receiving the bias control signal, a first end coupled to the system voltage, and a second end coupled to a control end of the second transistor; and a second switch, having a control end receiving the bias control signal, a first end coupled to the second end of the second transistor, and a second end coupled to the control end of the second transistor, wherein the first switch is turned on and the second switch is turned off when the bias control signal has the first potential, so as to set the first bias to a first normal bias value, and the first switch is turned off and the second switch is turned on when the bias control signal has the second potential, so as to set the first bias to a first low bias value.

2. The driving device for dynamic bias as claimed in claim 1, wherein the power-saving period is a stable-state period of the data voltage, and the power-saving period is not overlapped to the transition period of switching the switch from the turned-on state to the turned-off state.

3. The driving device for dynamic bias as claimed in claim 1, wherein the buffer comprises:

an operational amplifier, having a non-inverting terminal serving as an input terminal of the buffer, and an inverting terminal coupled to an output terminal of the operational amplifier and serving as an output terminal of the buffer; and a first buffer current source, having a control end receiving the first bias, a first end receiving a system voltage, and a second end coupled to a first power terminal of the operational amplifier, wherein the first buffer current source determines an operating state of the operational amplifier according to the first bias.

4. The driving device for dynamic bias as claimed in claim 1, wherein the bias control unit further comprises:

a second bias generating unit, coupled to the bias signal generating unit, and generating a second bias to the buffer according to the bias control signal, so as to control the buffer to operate in the normal bias state or the low bias state.

5. The driving device for dynamic bias as claimed in claim 4, wherein the second bias generating unit comprises:

a third transistor, having a first end coupled to a ground voltage, and a control terminal coupled to the buffer and a second end of the third transistor for generating the second bias;

a fourth transistor, having a first end coupled to the ground voltage;

a second current source, having a supply end coupled to the second end of the third transistor and a second end of the fourth transistor;

a third switch, having a control end receiving the bias control signal, a first end coupled to the ground voltage, and a second end coupled to a control end of the fourth transistor; and a fourth switch, having a control end receiving the bias control signal, a first end coupled to the second end of the fourth transistor, and a second end coupled to the control end of the fourth transistor, wherein the third switch is turned on and the fourth switch is turned off when the bias control signal has the first potential, so as to set the second bias to a second normal bias value, and the third switch is turned off and the fourth switch is turned on when the bias control signal has the second potential, so as to set the second bias to a second low bias value.

6. The driving device for dynamic bias as claimed in claim 4, wherein the buffer comprises:

an operational amplifier, having a non-inverting terminal serving as an input terminal of the buffer, and an inverting terminal coupled to an output terminal of the operational amplifier, and serving as an output terminal of the buffer;

a first buffer current source, having a control end receiving the first bias, a first end receiving a system voltage, and a second end coupled to a first power terminal of the operational amplifier; and a second buffer current source, having a control end receiving the second bias, a first end receiving a ground voltage, and a second end coupled to a second power terminal of the operational amplifier, wherein the first buffer current source and the second buffer current source determine an operating state of the operational amplifier according to the first bias and the second bias.

7. The driving device for dynamic bias as claimed in claim 1, wherein the bias control unit calculates the transition period of the data voltage, the power-saving period and the transition period of switching the switch from a turned-on state to a turned-off state by using an output enable signal of a gate driver.

* * * * *